Nov. 30, 1937.          R. W. WAGNER          2,100,678
POWER TAKE-OFF ATTACHMENT FOR MOTOR VEHICLES
Filed Oct. 28, 1935

INVENTOR
ROBERT W. WAGNER
BY
ATTORNEYS

Patented Nov. 30, 1937

2,100,678

UNITED STATES PATENT OFFICE 2,100,678

POWER TAKE-OFF ATTACHMENT FOR MOTOR VEHICLES

Robert W. Wagner, Detroit, Mich., assignor to Detroit Harvester Company, Detroit, Mich., a corporation of Michigan Application October 28, 1935, Serial No. 47,166

2 Claims. (Cl. 74—11)

The invention relates to power take-off units for attachment to the transmissions of motor vehicles and more particularly to transmissions of motor trucks. It is the object of the invention to obtain a simple construction of power take-off which may be easily attached to the transmission and which also provides for control of the same from the dash or instrument board of the vehicle. To this end, the invention consists in the construction as hereinafter set forth.

A is an integral hollow casing which is provided with a flange B for fitting about the opening in the transmission housing, and a plurality of apertured lugs C. The apertures in these lugs register with the bolt holes in the transmission housing and provide for the mounting of the attachment thereon. D is the power take-off shaft which extends through apertures in the opposite walls of the casing A, and is journaled therein by anti-friction roller bearings E and E'. The portion of the shaft D which extends across the hollow space within the housing is splined as indicated at F and has sleeved thereon a gear wheel G. This gear wheel G is adapted in one position of adjustment to mesh with a constantly driven gear wheel H in the transmission housing, while in another position it is disengaged from said gear wheel. For adjusting the gear wheel G just described, a shifter is arranged within the housing. This comprises a shaft I which is arranged parallel to the shaft D and has an enlarged portion J sliding in a bearing K formed integral with the housing. The portion J is transversely slotted at L to embrace the gear wheel G and beyond this slot are annular grooves M and M' for engagement with a latch comprising a ball N and a spring O. These members are placed in a transverse bore in the housing which is closed by a plug P. The shaft J extends through a bore in the casing which at one end is closed by an expanded dished cap Q, while at the other end there is an apertured closure cap R through which the shaft projects. An oil seal S is also arranged between this cap and shaft. The shaft D is secured within the housing by caps T and T' at opposite ends thereof, the cap T being apertured for the projecting portion of the shaft.

To control the device the gear wheel G must be moved into or out of mesh with the gear wheel H by a longitudinal movement of the shifter I. This is preferably accomplished by mounting on the casing A a fulcrum bracket U to which a lever V is pivotally attached. This lever passes through a bifurcated end of the shaft I and is connected thereto by a pin V' extending through a longitudinal slot V² in said lever. The free end of the lever is bifurcated and provided with a cross-pin W having a bore therethrough for engaging a wire X. This wire passes through a flexible conduit Y, one end of which is mounted in a lug A' on the housing A, while the other end extends to the vehicle dash or other convenient point of location for the controlling member. The controlling member comprises a knob or button Z attached to a plunger Z' slidably engaging a tubular bearing Z² to which the opposite end of the flexible conduit Y is secured. The tubular bearing Z² is externally threaded for the engagement of a clamping nut Z³ by means of which and a fixed collar Z⁴ the bearing may be mounted on the dash or other support.

Figure 1:
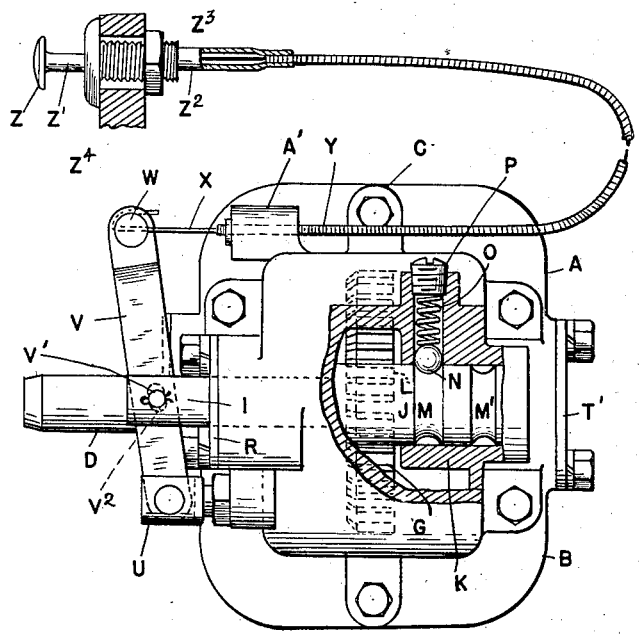
Figure 1 is a sectional elevation of my improved attachable power take-off unit.
Figure 2:
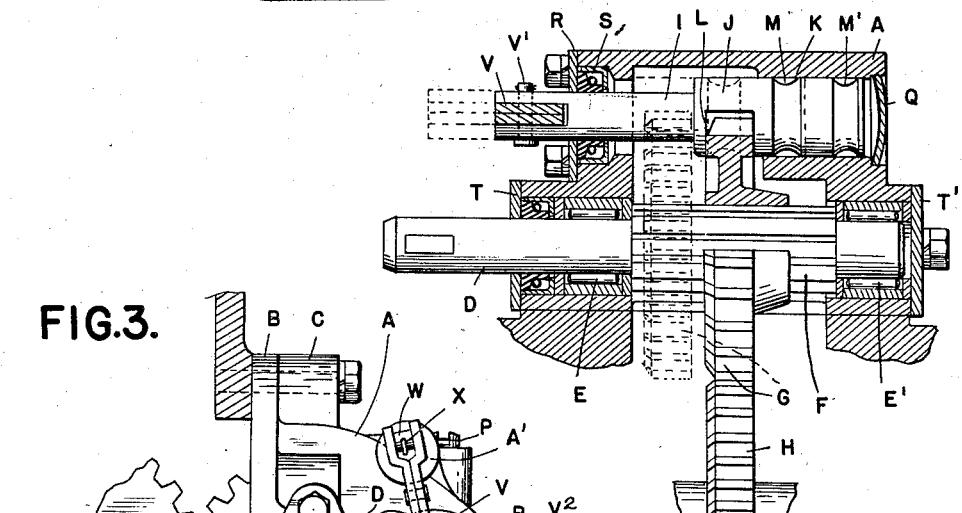
Figure 2 is a longitudinal section therethrough.
Figure 3:
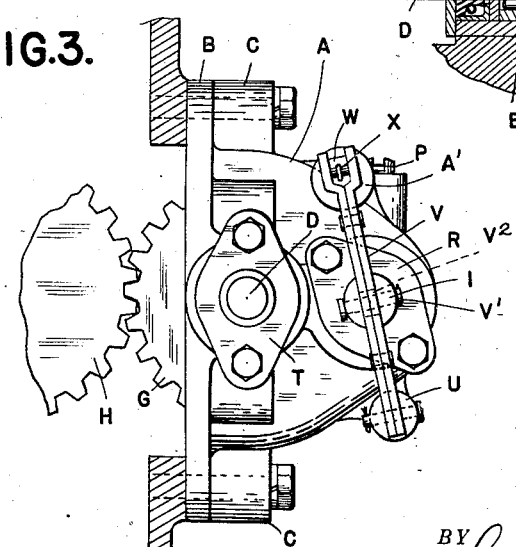
Figure 3 is an end elevation.

With the construction as described in operation the shifter I is normally in the position shown in Figure 2, where the gear G is in the position shown in dotted lines and is out of mesh with the gear wheel H of the transmission mechanism. It is yieldably held in this position by the latch N which engages the groove M' in the portion J. When it is desired to drive the shaft D the operator occupying the driver's seat of the vehicle can draw outward upon the knob Z. This communicates movement to the wire which passes through the flexible conduit Y and which at its opposite end is attached to the pin W. Thus the lever V will be drawn inward moving the shifter I from the dotted-line position to the full-line position in Figure 2, where the gear wheel G is in mesh with the gear wheel H. Thus, motion is communicated to the shaft D from which it is transmitted to any mechanism to be driven (not shown). When it is desired to stop the mechanism the knob Z is pressed inward which through the wire X will move the shifter I into the dotted-line position (Figure 2), where the gear wheels G and H are out of mesh.

What I claim as my invention is:

1. In a power take-off attachment for motor vehicles, the combination with a casing attachable to a transmission housing of a motor vehicle, a power take-off shaft journaled within said casing and projecting laterally therefrom, and a power take-off gear splined on said shaft and engageable with a gear of the transmission of the motor vehicle, of means for actuating said power take-off gear including a shaft slidably mounted within said casing substantially in parallel relation to said power take-off shaft and projecting laterally outwardly from said casing, said slidable shaft having an enlarged portion transversely slotted to embrace the periphery of the power take-off gear, a fulcrum bracket mounted on the casing below the slidable shaft, a lever pivoted at its lower end upon said bracket and pivotally connected intermediate its ends to the outer end of the slidable shaft, a tubular bearing attachable to an instrument panel of the motor vehicle, a boss on said casing substantially in horizontal alignment with the upper free end of the lever, a flexible conduit terminally mounted in said tubular bearing and boss, a plunger slidably engaging said tubular bearing, a knob attached to said plunger, and a wire extending through said flexible conduit and terminally connected to said plunger and to the upper free end of said pivoted lever.

2. In a power take-off attachment for a motor vehicle, the combination with a casing attachable to a transmission housing of a motor vehicle, a power take-off shaft journaled within said casing and projecting laterally therefrom, and a power take-off gear splined on said shaft and engageable with a gear of the transmission of the motor vehicle, of means for actuating said power take-off gear including a shaft slidably mounted within said casing and projecting laterally outwardly therefrom, said slidable shaft being operatively connected to the power take-off gear to shift the same longitudinally of the power take-off shaft, a fulcrum bracket mounted on the casing adjacent the slidable shaft, a lever pivoted at one end upon said bracket and pivotally connected intermediate its ends to the outer end of the slidable shaft, a tubular bearing attachable to an instrument panel of the motor vehicle, a boss on said casing, a flexible conduit terminally connected to said tubular bearing and boss, a plunger slidably engaging said tubular bearing, a knob attached to said plunger, and a wire extending through said flexible conduit and terminally connected to said plunger and to the free end of said pivoted lever.

ROBERT W. WAGNER.